US008676422B2

(12) United States Patent
Lee

(10) Patent No.: US 8,676,422 B2
(45) Date of Patent: Mar. 18, 2014

(54) CREEP CONTROL DEVICE AND METHOD FOR HYBRID VEHICLE

(75) Inventor: Taewoo Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/562,823

(22) Filed: Jul. 31, 2012

(65) Prior Publication Data

US 2013/0103235 A1  Apr. 25, 2013

(30) Foreign Application Priority Data

Oct. 19, 2011 (KR) .................. 10-2011-0107148

(51) Int. Cl.
*B60W 40/00* (2006.01)
*B60W 40/105* (2012.01)
*B60W 20/00* (2006.01)

(52) U.S. Cl.
USPC ............ 701/22; 701/74; 701/79; 701/81; 701/93; 701/96; 701/110; 701/119; 701/121; 701/301; 903/905; 903/912; 903/915; 903/946

(58) Field of Classification Search
CPC ............. B60W 30/18063; B60W 30/18009; B60W 10/26; B60W 20/106
USPC ............. 701/22, 74, 79, 81, 93, 96, 110, 119, 701/121, 301; 903/905, 912, 915, 946
See application file for complete search history.

(56) References Cited

U.S. PATENT DOCUMENTS

| | | | | |
|---|---|---|---|---|
| 4,784,020 A | * | 11/1988 | Hamano et al. | 477/93 |
| 2003/0225501 A1 | * | 12/2003 | De La Salle et al. | 701/93 |
| 2009/0093336 A1 | * | 4/2009 | Soliman et al. | 477/5 |
| 2010/0004809 A1 | * | 1/2010 | Itoh | 701/22 |
| 2010/0049413 A1 | * | 2/2010 | Makino et al. | 701/65 |
| 2011/0039655 A1 | * | 2/2011 | Kaltenbach et al. | 477/5 |
| 2011/0048822 A1 | * | 3/2011 | Kaltenbach et al. | 180/65.25 |
| 2013/0090799 A1 | * | 4/2013 | Nakamura et al. | 701/22 |
| 2013/0090800 A1 | * | 4/2013 | Nakamura et al. | 701/22 |
| 2013/0103235 A1 | * | 4/2013 | Lee | 701/22 |

FOREIGN PATENT DOCUMENTS

| | | |
|---|---|---|
| JP | 11069508 A | 3/1999 |
| JP | 11299006 A | 10/1999 |
| JP | 3642709 | 2/2005 |
| JP | 2009-012655 A | 1/2009 |
| KR | 10-1999-0053659 A | 7/1999 |
| KR | 10-2000-0008202 | 5/2000 |
| KR | 10-0267300 | 7/2000 |
| WO | 2009074484 A2 | 6/2009 |
| WO | 2009086995 A1 | 7/2009 |

* cited by examiner

*Primary Examiner* — Mary Cheung
*Assistant Examiner* — Atul Trivedi
(74) *Attorney, Agent, or Firm* — Edwards Wildman Palmer LLP; Peter F. Corless

(57) ABSTRACT

Disclosed is a creep control system and method for a hybrid vehicle, which controls the driving of a motor according to the distance to a preceding vehicle in order to provide creep driving when the hybrid vehicle has come to a complete stop. In particular, driving information is detected and a determination is made as to whether the hybrid vehicle is in an idle stop and completely stationary state. Then when the hybrid vehicle is in the idle stop and completely stationary state, a determination is made as to whether a distance from a preceding vehicle is more than a predetermined distance. When the distance to the preceding vehicle is more than the predetermined distance, a motor is driven to perform creep driving.

12 Claims, 2 Drawing Sheets

CREEP CONTROL DEVICE AND METHOD FOR HYBRID VEHICLE

CROSS-REFERENCE TO RELATED APPLICATION

This application claims priority to and the benefit of Korean Patent Application No. 10-2011-0107148 filed in the Korean Intellectual Property Office on Oct. 19, 2011, the entire contents of which are incorporated herein by reference.

BACKGROUND OF THE INVENTION (a) Field of the Invention

The present invention relates to a hybrid vehicle, and more particularly, to a creep control device and method for a hybrid vehicle, which control the driving of a motor according to the distance to a preceding vehicle in order to provide creep driving once the hybrid vehicle has come to a complete stop.

(b) Description of the Related Art

An automatic transmission installed in a typical internal combustion engine vehicle transmits power from an engine through a torque converter, and provides creep driving so that the vehicle moves slightly even when the accelerator pedal is not pressed, while operating in lower speeds and the vehicle is in Drive (D) or reverse (R). This allows a vehicle to get take off smoothly, and may help the vehicle avoid rolling backward when the vehicle is very slowly moving or temporarily stopping and then starting up an inclined road.

In order to reduce costs and minimize the loss of torque transmitted to an automatic transmission, a hybrid vehicle has an engine clutch installed between an engine and a motor instead of a torque converter. Such a hybrid vehicle that does not have a torque converter installed typically includes an engine that enters an idle stop state when stationary, performs motor-driven creep driving to reduce the dissimilarity to typical passenger vehicles and provide comfortable drivability.

In a hybrid vehicle, creep torque may vary depending on whether the brake pedal is deployed and whether the vehicle is stationary. For example, when the brake pedal is deployed and the vehicle is stationary, torque output is not required so that creep torque is controlled to a minimum value—but not to "0" in consideration of the vehicle's off-the-line responsiveness.

Such a hybrid vehicle typically generates creep torque even at a standstill, in view of take off responsiveness, whereby unnecessary driving of the motor occurs, causing draining of the battery. Accordingly, repeated charging and discharging of the battery by the engine may occur, causing deteriorated fuel efficiency, and the repeated charging and discharging may cause a reduction in battery efficiency.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a creep control device and method for a hybrid vehicle having the advantages of providing active creep control by controlling the driving of a motor according to the distance to a preceding vehicle, when the hybrid vehicle is completely stationary.

An exemplary embodiment of the present invention provides a creep control device for a hybrid vehicle having an engine and a motor, including: a vehicle speed detecting unit detecting a vehicle speed; an inter-vehicle distance detecting unit detecting a distance to preceding vehicle; a motor controller configured to control driving of a motor with the voltage from a battery; and a hybrid controller configured to analyze the distance to a preceding vehicle provided by the inter-vehicle distance detecting unit when information from the vehicle speed detecting unit is detected as a complete stop during driving, and performing creep driving by controlling the driving of the motor through the motor controller when the distance to the preceding vehicle exceeds a predetermined distance.

The hybrid controller may stop the driving of the motor when the distance to the preceding vehicle becomes equal to or less than the predetermined distance in a state in which creep driving is being performed through the driving of the motor. The inter-vehicle distance detecting unit may be configured as a distance measurement sensor, and may be installed at a predetermined position on a cabin rearview mirror or a front bumper.

Another exemplary embodiment of the present invention provides a creep control method for a hybrid vehicle, including: detecting driving information and determining whether the hybrid vehicle is in an idle stop and completely stationary state; determining, when the hybrid vehicle is in the idle stop and completely stationary state, whether a distance from a preceding vehicle is more than a predetermined distance; and driving a motor to perform creep driving when the distance to the preceding vehicle exceeds a predetermined distance. The driving information may include vehicle speed, engine rpm, brake pedal displacement, and accelerator pedal displacement information. When the distance to the preceding vehicle is equal to or less than the predetermined distance while the creep driving is being performed by driving the motor, the creep driving may be stopped.

Such a hybrid vehicle according to an exemplary embodiment of the present invention performs creep driving by driving a motor according to an inter-vehicle distance, and does not drive the motor in a stationary state and in a low-speed range when creep torque is not needed, thus minimizing battery drainage, and allowing for driving stability in electric vehicle (EV) mode. Further, because unnecessary battery drainage does not occur, enhancement of fuel efficiency may be ultimately provided, and battery efficiency may be stabilized and maintained. In addition, since the present invention may stably maintain an inter-vehicle distance required by a driver, driving convenience and stability may be provided.

DESCRIPTION OF SYMBOLS

10: Inter-vehicle distance detecting unit
11: Vehicle speed detecting unit
20: HCU
30: MCU
70: Motor

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a server or a network. Additionally, although the exemplary embodiment is described as using one control unit to perform the above process, it is understood that the above processes may also be performed by a plurality of control units, controllers, processors or the like.

The present invention relates to a technology for creep control of a hybrid vehicle, and because the driving operation of the hybrid vehicle is performed in the same way as a typical operation a detailed description thereof will not be provided.

Figure 1:
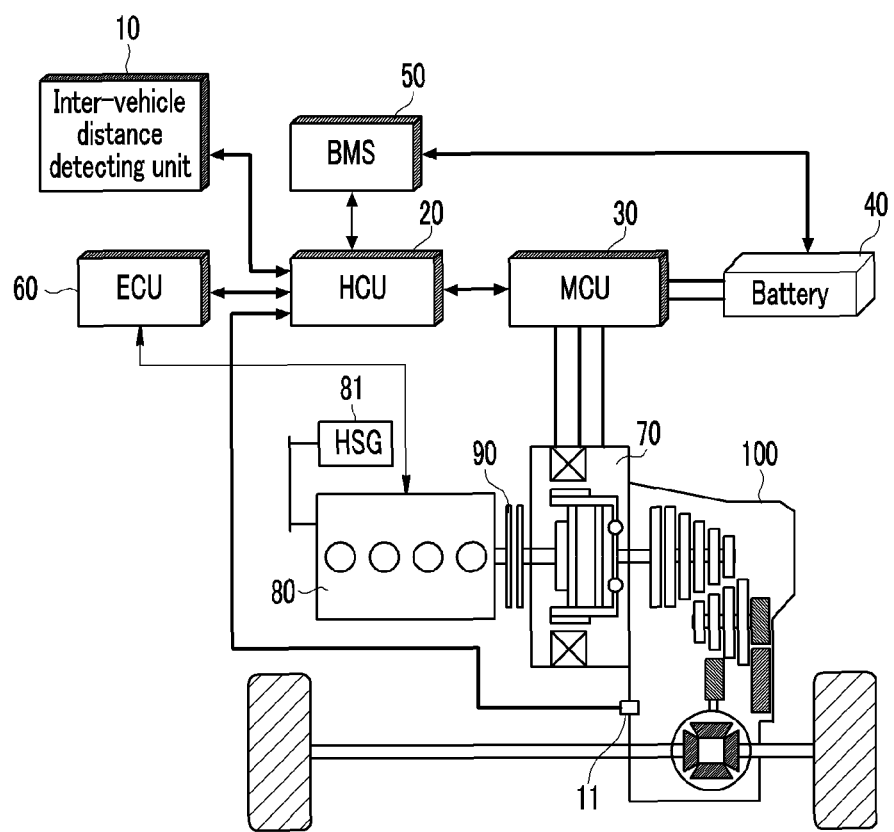
FIG. 1 a drawing schematically illustrating a creep control device for a hybrid vehicle according to an exemplary embodiment of the present invention.
Figure 2:
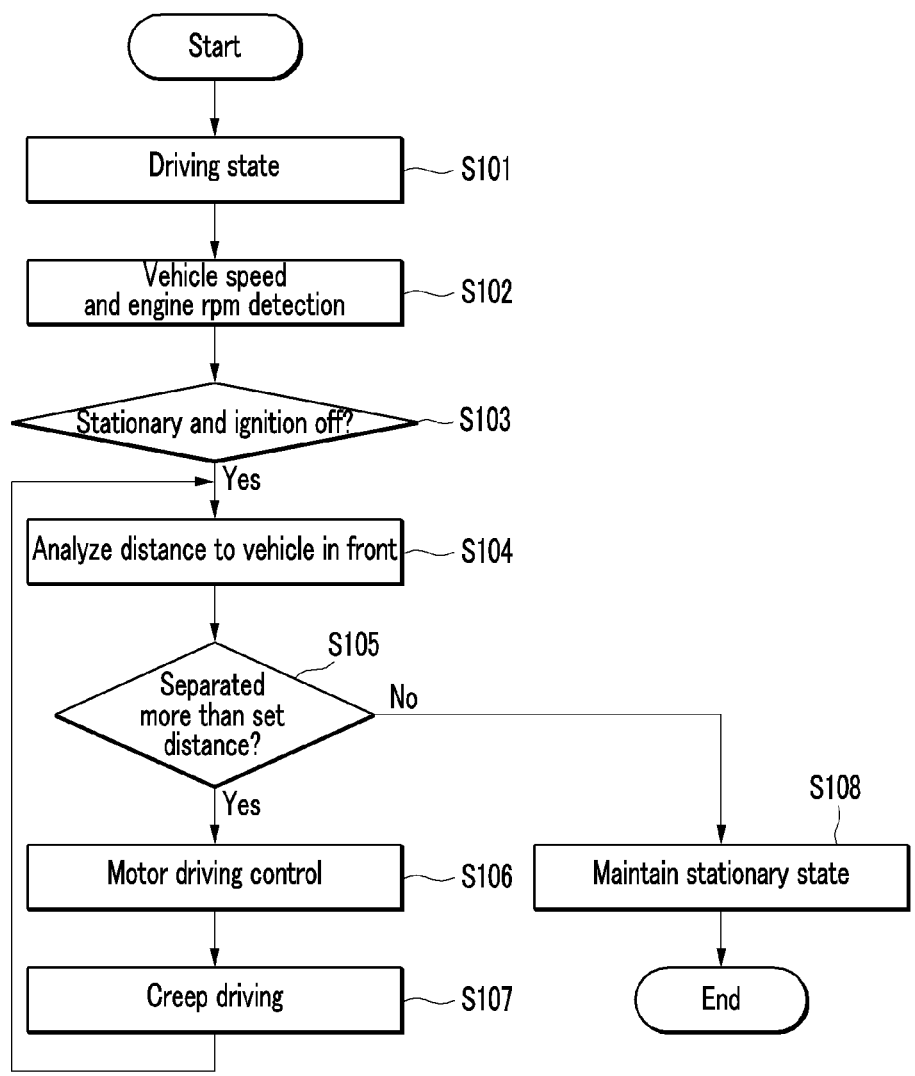
FIG. 2 is a flowchart illustrating a creep control process for a hybrid vehicle according to an exemplary embodiment of the present invention.

FIG. 1 a drawing schematically illustrating a creep control device for a hybrid vehicle according to an exemplary embodiment of the present invention. As illustrated in FIG. 1, the present invention may include an inter-vehicle distance detecting unit 10, a vehicle speed detecting unit 11, an hybrid control unit (HCU) 20, an motor control unit (MCU) 30, a battery 40, a battery management system (BMS) 50, an engine control unit (ECU) 60, a motor 70, an engine 80, an hybrid start and generator (HSG) 81, a clutch 90, and a transmission 100.

More specifically, the inter-vehicle distance detecting unit 10 may be configured to detect the distance to a preceding vehicle and provide information thereon to the HCU 20. The inter-vehicle distance detecting unit 10 may be a distance measurement sensor, and may be installed at a predetermined position on a cabin rearview minor or a front bumper.

The vehicle speed detecting unit 11, on the other hand, may be configured to detect the vehicle speed from the output shaft of the transmission and provides information thereon to the HCU 20. The HCU 20 controls output torque through integrated control of each controller through a network according to driving requirements and the vehicle state, and controls the clutch 90 according to driving conditions, to provide EV mode and HEV mode driving.

Further, when information provided from the vehicle speed detecting unit 11 shows that the vehicle is completely stationary during driving, the HCU 20 analyzes the distance to the preceding vehicle provided by the inter-vehicle distance detecting unit 10, and determines, when it is determined that the distance between the present vehicle and the preceding vehicle exceeds a predetermined distance, that the two vehicles are more than the predetermined distance apart, and controls the driving of the motor 70 through the MCU 30 to perform creep driving. The HCU 20 stops the driving of the motor 70 to prevent unnecessary draining of the battery 40, when the distance to the preceding vehicle provided by the inter-vehicle distance detecting unit 10 is equal to or less than the predetermined distance, while performing creep driving through driving of the motor 70 by the MCU 30.

In the above, the HCU 20 may further include information on the acceleration pedal and the brake pedal, in addition to the vehicle speed and inter-vehicle distance information.

The MCU 30 performs creep driving by controlling the driving of the motor 70 through converting the DC voltage from the battery 40 to a 3-phase AC voltage, according to a control signal provided by the HCU 20 through a network. The motor 70 is operated by the 3-phase AC voltage applied from the MCU 30 to generate creep torque. The MCU 30 may include an inverter configured with a plurality of power switching devices, and the power switching devices may be configured with any one of an IGBT (Insulated Gate Bipolar Transistor), a metal-oxide-semiconductor field-effect transistor (MOSFET), or a transistor.

The battery 40 is formed of a plurality of unit cells, and stores a high voltage of DC 350V, for example. The BMS 50 detects the current, the voltage, and the temperature of each cell within the operating range of the battery 40, controls the SOC (State Of Charge) thereof, and controls charging and discharging voltages of the battery 40 to prevent shortened battery life due to over-discharging to below a threshold voltage or overcharging to above a threshold voltage.

The ECU 60 drives the HSG 81 according to a control signal applied from the HCU 20 through a network, and performs ignition "on" of the engine 80 to provide charging of the battery 40 and driving in HEV (hybrid) mode. The engine 80 has engine ignition on/off functions and the output thereof controlled by the ECU 60, and has intake air quantity thereof controlled through an ETC (Electric Throttle Control) (not illustrated). The HSG 81 operates as a starter and a generator, and performs ignition on of the engine 80 and generates a voltage to provide a charge for the battery 40. In addition, the clutch 90 may be disposed between the engine 80 and the motor 70 and controls the connecting of power between the engine 80 and the motor 70 according to the driving mode.

A creep control process for a hybrid vehicle according to the present invention including the above-described functions is implemented as follows.

With a hybrid vehicle to which the present invention is applied in a driven state in step S101, the HCU 20 detects the distance to the preceding vehicle provided by the inter-vehicle distance detecting unit 10, and the vehicle speed detecting unit 11 detects the vehicle speed in step S102. In addition information on engine rpm, the accelerator pedal, and the brake pedal is detected.

In step S103, the HCU 20 analyzes the detected information to determine whether the engine ignition is off and the information from the vehicle speed detecting unit 11 shows that the vehicle is completely stationary. In step S103, when the HCU 20 determines that the engine ignition is off and the vehicle is completely stationary, the distance to the preceding vehicle provided by the inter-vehicle distance detecting unit 10 is analyzed in step S104, and it is determined in step S105 whether the distance between the present vehicle and the preceding vehicle is greater than a predetermined distance.

In step S105, when the HCU 20 determines that the present vehicle is completely stationary and is a distance between the preceding vehicle is more than the predetermined distance, the driving of the motor 70 is controlled through the MCU 30 and creep driving is performed in steps S106 and S107. Creep driving speed through driving of the motor 70 may be maintained at about 1-3 KPH, for example.

As described above, with the HCU 20 performing creep driving by controlling the driving of the motor 70 through the MCU 30, the distance to the preceding vehicle provided by the inter-vehicle distance determining unit 10 is analyzed, and when the distance becomes equal to or less than the predetermined distance, the driving of the motor 70 is stopped in step S108 to prevent unnecessary draining of the battery 40.

Accordingly, an example has been described above of where creep driving is automatically/dynamically controlled with the vehicle completely stationary, according to the distance to the vehicle in front. Moreover, creep driving may be performed according to the selection of a separate switch that is installed for selecting creep driving, and all similar techniques besides the selecting of a switch that are the same or similar to the above-described operations will fall within the scope of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A creep control device for a hybrid vehicle having an engine and a motor, the device comprising:
    a vehicle speed detecting unit configured to detect a vehicle speed;
    an inter-vehicle distance detecting unit configured to detect a distance to a preceding vehicle;
    a motor controller configured to control driving of a motor with voltage of a battery; and
    a hybrid controller configured to analyze the distance to the preceding vehicle provided by the inter-vehicle distance detecting unit when information from the vehicle speed detecting unit indicates that the vehicle is completely stationary, and perform creep driving of the vehicle by controlling the driving of the motor through the motor controller when the distance to the preceding vehicle is determined to exceed a predetermined distance while the engine is stopped and in a completely stationary state.

2. The creep control device for a hybrid vehicle of claim 1, wherein:
    the hybrid controller stops the driving of the motor when the distance to the preceding vehicle becomes equal to or less than the predetermined distance when creep driving is being performed through the driving of the motor.

3. The creep control device for a hybrid vehicle of claim 1, wherein:
    the inter-vehicle distance detecting unit is configured as a distance measurement sensor, and is installed at a predetermined position on a rearview mirror or a front bumper.

4. A creep control method for a hybrid vehicle, comprising:
    detecting, by a controller, driving information and determining whether the hybrid vehicle is in an idle stop and completely stationary state;
    determining, by the controller, when the hybrid vehicle is in the idle stop and completely stationary state, whether a distance from a preceding vehicle is more than a predetermined distance; and
    driving, by the controller, a motor to perform creep driving when the distance to the preceding vehicle is more than the predetermined distance.

5. The creep control method for a hybrid vehicle of claim 4, wherein:
    the driving information includes vehicle speed, engine rpm, brake pedal displacement, and accelerator pedal displacement information.

6. The creep control method for a hybrid vehicle of claim 4, wherein:
    when the distance to the preceding vehicle is equal to or less than the predetermined distance while the creep driving is being performed by driving the motor, the creep driving is stopped.

7. A non-transitory computer readable medium containing program instructions executed by a processor or controller, the computer readable medium comprising:
    program instructions that detect driving information and determine whether the hybrid vehicle is in an idle stop and completely stationary state;
    program instructions that determine when the hybrid vehicle is in the idle stop and completely stationary state, whether a distance from a preceding vehicle is more than a predetermined distance; and
    program instructions that drive a motor to perform creep driving when the distance to the preceding vehicle is more than the predetermined distance while the hybrid vehicle is in the idle stop and completely stationary.

8. The non-transitory computer readable medium of claim 7, wherein:
    the driving information includes vehicle speed, engine rpm, brake pedal displacement, and accelerator pedal displacement information.

9. The non-transitory computer readable medium of claim 7, wherein:
    when the distance to the preceding vehicle is equal to or less than the predetermined distance while the creep driving is being performed by driving the motor, the creep driving is stopped.

10. A method comprising:
    receiving, by a hybrid controller, driving information and determining whether a hybrid vehicle is in an idle stop and completely stationary state;
    determining, by the hybrid controller, when the hybrid vehicle is in the idle stop and completely stationary state, whether a distance from a preceding vehicle is more than a predetermined distance; and
    driving, by the hybrid controller, a motor to perform creep driving when the distance to the preceding vehicle is more than the predetermined distance while the hybrid vehicle is in the idle stop and completely stationary.

11. The method of claim 10, wherein:
    the driving information includes vehicle speed, engine rpm, brake pedal displacement, and accelerator pedal displacement information.

12. The method of claim 10, further comprising:
    stopping creep driving when the distance to the preceding vehicle is equal to or less than the predetermined distance while the creep driving is being performed by driving the motor.

* * * * *